United States Patent [19]

Matsuzaki et al.

[11] Patent Number: 5,688,430
[45] Date of Patent: Nov. 18, 1997

[54] SOFT FERRITE RAW MATERIAL POWDER, ITS SINTERED BODY, AND THEIR PRODUCTION METHOD AND APPARATUS

[75] Inventors: Katsushige Matsuzaki; Tatsunori Sunagawa; Kenji Kawahito, all of Futtsu; Junji Omori, Tokyo; Yoshitaka Yamana, Tokyo; Shoichi Osada, Tokyo; Kiyoshi Aritome, Tokyo; Yoshimasa Ikeda, Futtsu; Izumi Matsushita, Tokyo; Wataru Ohashi, Kawasaki; Kaoru Ito, Kawasaki; Fumihiko Hasegawa, Kawasaki; Shinya Nariki, Kawasaki; Michimasa Sasaki, Kawasaki; Noritane Tsugane, Kashiwa; Toshiaki Kurihara, Ibaraki, all of Japan

[73] Assignee: Nippon Steel Corporation, Tokyo, Japan

[21] Appl. No.: 507,519

[22] PCT Filed: Feb. 23, 1993

[86] PCT No.: PCT/JP93/00222

§ 371 Date: Nov. 16, 1995

§ 102(e) Date: Nov. 16, 1995

[87] PCT Pub. No.: WO94/19283

PCT Pub. Date: Jan. 9, 1994

[51] Int. Cl.[6] .......................... C04B 35/36; C04B 35/38; C04B 35/40; C04B 35/46
[52] U.S. Cl. ...................... 252/62.62; 252/62.57; 423/594
[58] Field of Search ................ 252/62.62, 62.57; 423/594

[56] References Cited

U.S. PATENT DOCUMENTS 5,462,686  10/1995  Sugiyama et al. .............. 252/62.62

FOREIGN PATENT DOCUMENTS

| 55-144421 | 11/1980 | Japan . |
| 63-156017 | 6/1988 | Japan . |
| 63-156909 | 6/1988 | Japan . |
| 63-315522 | 12/1988 | Japan . |
| 1-192708 | 8/1989 | Japan . |
| 1-224265 | 9/1989 | Japan . |
| 2-54901 | 2/1990 | Japan . |
| 4-92822 | 3/1992 | Japan . |
| 5-279044 | 10/1993 | Japan ............. 252/62.62 |
| 6-171951 | 6/1994 | Japan ............. 252/62.62 |
| 6-293521 | 10/1994 | Japan ............. 252/62.62 |

OTHER PUBLICATIONS

Chemical Abstracts citation 122:44708, abstract for JP 6-260321, Sep. 16, 1994.
Chemical Abstracts citation 122:229036, absract for JP 6-333724, Dec. 2, 1994.

*Primary Examiner*—Melissa Bonner
*Attorney, Agent, or Firm*—Kenyon & Kenyon

[57] ABSTRACT

This invention provides an atomization roasting method which can easily obtain a soft ferrite sintered body, for example, a sintered body having a crystal particle size of not greater than 2 μm, by using as a raw material an ultra-fine powder having a mean particle size of not greater than 0.1 μm obtained by atomization roasting and which can obtain a soft ferrite raw material powder subjected to an oxidation reaction, having an extremely small residual chlorine content, and having and extremely small deviation of high vapor pressure components such as zinc between the atomized raw material solution and the oxide as the product and which can economically produce a soft ferrite core having an excellent power loss characteristic in a high frequency range, particularly in a MHz range, and is extremely effective for reducing the size of a high frequency transformer. In the production method of the soft ferrite raw material powder, the deviation of the recovered powder becomes extremely small and residual hydrogen chloride and chlorides can be reduced. Therefore, loads to the component adjustment step after roasting and to the Cl removing step can be reduced and process steps can be eliminated. Accordingly, the present invention can drastically reduce the cost of production and can improve quality.

8 Claims, 12 Drawing Sheets

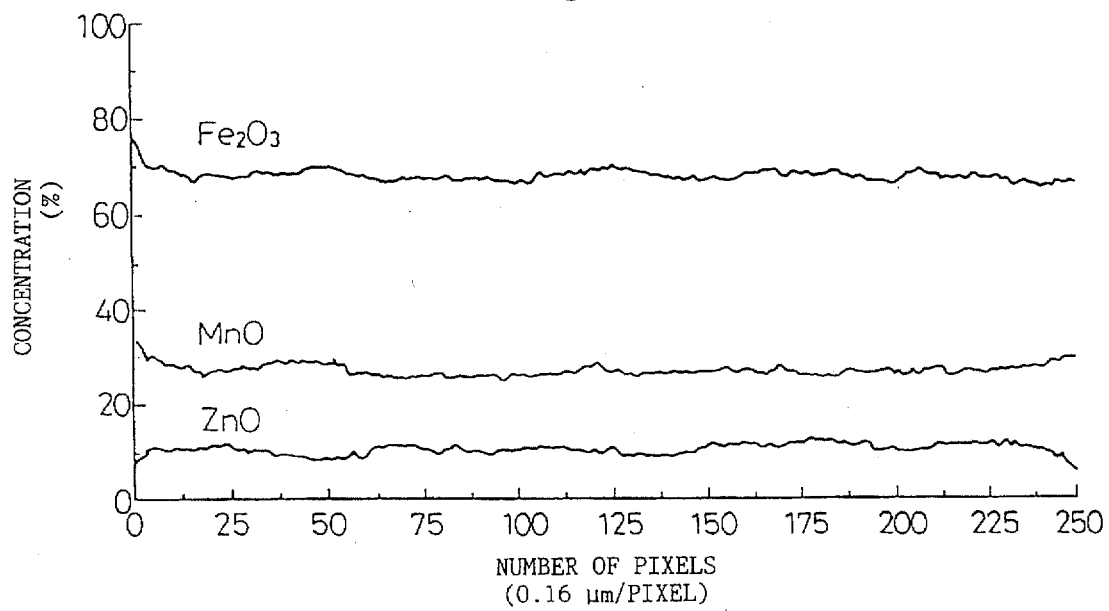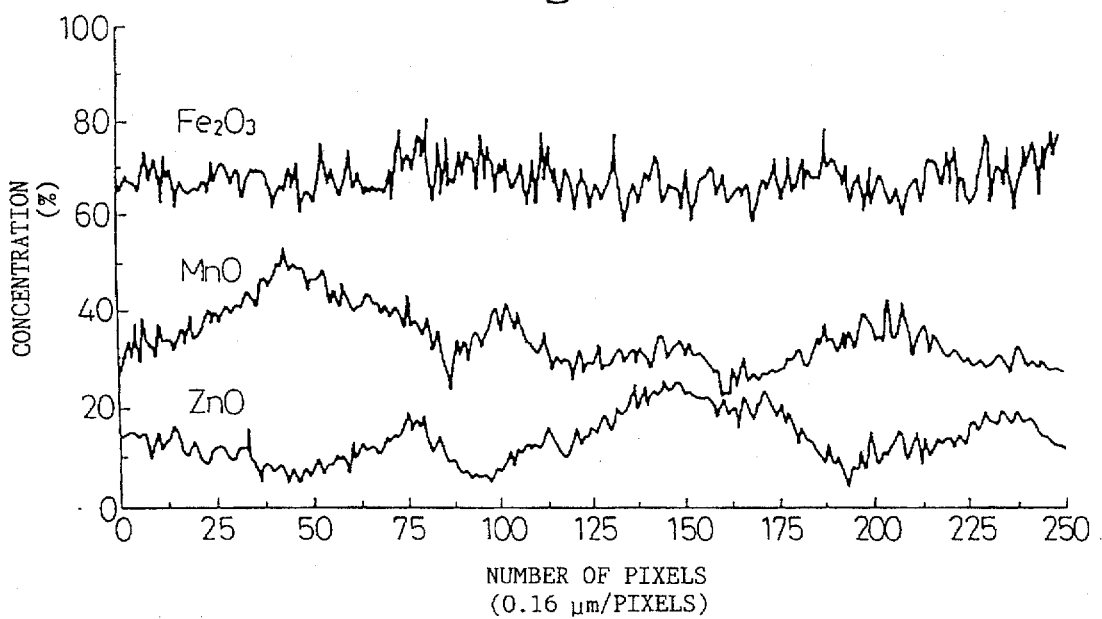

○ --- $ZnCl_2 + \frac{1}{2}O_2 = ZnO + Cl_2$ (1)

● --- $MnCl_2 + \frac{1}{2}O_2 = MnO + Cl_2$ (2)

□ --- $\frac{3}{4}MnCl_2 + \frac{1}{2}O_2 = \frac{1}{4}Mn_3O_4 + \frac{3}{4}Cl_2$ (3)

■ --- $\frac{2}{3}MnCl_2 + \frac{1}{2}O_2 = \frac{1}{3}Mn_2O_3 + \frac{2}{3}Cl_2$ (4)

△ --- $FeCl_2 + \frac{1}{2}O_2 = FeO + Cl_2$ (5)

▲ --- $\frac{3}{4}FeCl_2 + \frac{1}{2}O_2 = \frac{1}{4}Fe_3O_4 + \frac{3}{4}Cl_2$ (6)

◇ --- $\frac{2}{3}FeCl_2 + \frac{1}{2}O_2 = \frac{1}{3}Fe_2O_3 + \frac{2}{3}Cl_2$ (7)

○ --- $ZnCl_2 + H_2O = ZnO + 2HCl$ (1)

● --- $MnCl_2 + H_2O = MnO + 2HCl$ (2)

□ --- $\frac{3}{4}MnCl_2 + H_2O = \frac{1}{4}Mn_3O_4 + \frac{3}{2}HCl + \frac{1}{4}H_2$ (3)

■ --- $\frac{2}{3}MnCl_2 + H_2O = \frac{1}{3}Mn_2O_3 + \frac{4}{3}HCl + \frac{1}{3}H_2$ (4)

△ --- $FeCl_2 + H_2O = FeO + 2HCl$ (5)

▲ --- $\frac{3}{4}FeCl_2 + H_2O = \frac{1}{4}Fe_3O_4 + \frac{3}{2}HCl + \frac{1}{4}H_2$ (6)

◇ --- $\frac{2}{3}FeCl_2 + H_2O = \frac{1}{3}Fe_2O_3 + \frac{4}{3}HCl + \frac{1}{3}H_2$ (7)

○ --- $2MnCl_2 + 2H_2O + \frac{1}{2}O_2 = Mn_2O_3 + 4HCl$ (1)

● --- $3MnCl_2 + 3H_2O + \frac{1}{2}O_2 = Mn_3O_4 + 6HCl$ (2)

□ --- $2FeCl_2 + 2H_2O + \frac{1}{2}O_2 = Fe_2O_3 + 4HCl$ (3)

■ --- $3FeCl_2 + 3H_2O + \frac{1}{2}O_2 = Fe_3O_4 + 6HCl$ (4)

TIME FROM ATOMIZATION ROASTING TO QUENCHING $H_2O$ OR $O_2$ MOLAR FRACTION IN COOLING MEDIUM IN TOTAL GAS QUALITY (%)

SOFT FERRITE RAW MATERIAL POWDER, ITS SINTERED BODY, AND THEIR PRODUCTION METHOD AND APPARATUS

TECHNICAL FIELD

This invention relates to a soft ferrite raw material powder, its sintered body, and their production method and apparatus. More particularly, the present invention relates to a soft ferrite raw material powder, its ferrite sintered body, a method of producing directly a ferrite powder by atomizing and roasting a solution containing chlorides of metal elements constituting the ferrite, an apparatus for this method, and a production method of a ferrite sintered body.

BACKGROUND ART

Recently, the reduction of the size and weight of power transformers used for a switching power supply, etc., has been required and for this reason, the driving frequency has been expanded to a high frequency range beyond the conventional range of from 100 KHz to 500 KHz, and the future application in the MHz range has been examined. However, because an eddy current loss, which becomes a particular problem in the high frequency range among the power loss, is proportional to the square of the driving frequency, the power loss increases with the increase of the frequency, so that exothermy cannot be neglected. Various proposals have been made in the past to solve such a problem. Among them, some represent that high performance can be expected for a soft ferrite sintered body necessary for accomplishing high characteristics by a fine structure in which texture fluctuation of individual crystal particles is less, and which has small amounts of impurities and has a high density.

Particularly because the reduction of the crystal particle diameter of the sintered body is effective, Japanese Unexamined Patent Publication (Kokai) No. 1-224265 teaches to produce a fine sintered body having a mean crystal diameter of 5 μm so as to restrict the power loss in the high frequency range. Another improvement example which uses fine powder prepared by a hydrothermal synthesis method as the raw material powder has been reported (refer to "Nikkei Material & Technology", 125, (1993) 24). The soft ferrite raw material powder for obtaining such a sintered body must have smaller amounts of impurities, must have uniform components and small variance of particle size distribution and must be fine particles. Therefore, improvements and development have been continued.

A method of atomizing and thermally decomposing a pickling waste liquor of steel is known as one of the iron oxide methods of obtaining soft ferrite raw materials. In this case, if various metallic ions constituting the ferrite are mixed in the pickling water liquor, a ferrite powder can be obtained by atomization and thermal decomposition. According to the ordinary atomization thermal decomposition method, however, components having a high vapor pressure such as zinc evaporate, and a homogeneous composition cannot be obtained so easily. Therefore, Japanese Unexamined Patent Publication (Kokai) No. 55-144421 discloses a production method of a soft ferrite sintered body which mixes Fe and Mn ions, which have stable high temperature thermal decomposition characteristics, as the soft ferrite raw material powder in the form of an aqueous chloride solution, prepares a mixed oxide containing Fe—Mn in a predetermined composition by atomization thermal decomposition (roasting), then mixes zinc oxide powder, and thereafter conducts pulverization, granulation, molding and sintering.

On the other hand, as a method of producing a composite oxide for the Zn-containing soft ferrite raw material powder, Japanese Unexamined Patent Publication (Kokai) No. 63-156017 discloses a method which sprays a chloride solution containing the ferrite raw materials in a predetermined composition to a fluidization roasting furnace to conduct a high temperature oxidation reaction, withdraws the powder with the decomposition products, and recovers the soft ferrite raw material powder by a dust collector.

As an improvement of Japanese Unexamined Patent Publication (Kokai) No. 63-156017 described above, Japanese Unexamined Patent Publication (Kokai) No. 1-192708 discloses a method which atomizes and mixes a high temperature high velocity gas not containing a reducing material with a mixed solution of starting metal chlorides, quickly keeps a predetermined roasting temperature and decomposes the metal chloride mixture while being accompanied by the flow of the starting materials and the decomposition products in the concurrent arrangement with the heat gas flow.

As to the purification of the chloride solution, Japanese Unexamined Patent Publication (Kokai) No. 63-315522 discloses a method which brings the aqueous iron chloride solution into contact with the roasting gas generated during this process so as to conduct heat concentration and to insolubilize the Si component in the aqueous iron chloride solution, then adds iron into this solution so as to consume the free acid within a range of pH of 1 to 3, and to insolubilize the major proportion of Al, Cr, Cu and P components in the solution, and separates and removes the insoluble matters.

According to the prior art technologies described above, however, it is difficult to produce a sintered body having a crystal particle diameter of not greater than 2 μm. To produce a sintered body having such a ultra-small particle diameter, it has been necessary to use ultra-fine powder produced by the hydrothermal method and conduct sintering by HIP or hot press. However, when the powder produced by the hydrothermal method is used as the starting material or when HIP and the hot press are used as the sintering equipment, the production cost becomes extremely high, and a problem yet remains unsolved in the aspect of mass-producibility.

When a method which sprays the chloride solution into the fluidization roasting furnace and conducts the high temperature oxidation reaction as the production method of the composite oxide for the soft ferrite raw material powder is employed, the strict control of the reaction time cannot be conducted after spraying of the raw material solution due to the structural limitation of the fluidization roasting furnace, and the reaction time varies from several seconds to some dozens of minutes. Therefore, though the particle size of the ferrite raw material powder and microscopic homogeneity of the composition can be improved, the problems that the particle diameter distribution is great and component deviation is great, too, remain unsolved.

In the atomization roasting method according to the prior art, the essential conditions for controlling the particle diameter of the soft ferrite raw material powder as the product and the components thereof, such as the spray method of the starting materials, control of the sprayed droplets, quenching by using a cooling medium containing $H_2O$ and/or $O_2$ after the reaction for a predetermined time, etc., have not been established with the exception of the condition that roasting is carried out in the vapor-containing oxidizing atmosphere. If these conditions are not stipulated, thermal decomposition and high temperature oxidation by atomization roasting become incomplete, and chlorides in amounts as great as 1 to 3% remain due to the chlorination reaction of the undecomposed matters or the reaction products. Further, evaporation scattering of zinc takes place. If control of the sprayed droplets is incomplete, variance occurs in the particle diameter of the resulting oxide powder. Therefore, these methods have not yet been complete as the production method of the Fe, Zn and Mn type soft ferrite raw material powder.

The present invention aims at providing a raw material powder, a sintered body, its production method and its apparatus which solve the problems involved in the production of a soft ferrite raw material powder which is most suitable for high frequency transformers of the recent type and has excellent homogeneity, and can particularly produce a soft ferrite core having an excellent power loss.

DISCLOSURE OF THE INVENTION

To solve the problems described above, the present invention has examined a raw material calcined powder and a sintering condition of a molded article, and has thus been accomplished. In other words, the present invention has found out that a soft ferrite sintered body having a very small crystal particle diameter of not greater than 2 μm can be easily obtained by using an ultra-fine powder having a mean particle diameter of not 0.1 μm, as measured by TEM observation, and applying normal pressure sintering to this powder in a controlled sintering atmosphere at a temperature not higher than 1,100° C. Further, a soft ferrite sintered body having a uniform particle diameter of from 2 μm to dozens of microns can be produced by sintering this powder at a temperature of from 1,100° to 1,350° C. Still further, the present invention provides an atomization roasting method, and an apparatus therefor, which can obtain a soft ferrite raw material powder which is subjected to a sufficient oxidation reaction, has an extremely small amount of residual chlorine content and hardly has evaporation scattering of Zn, by controlling the amounts of $H_2O$ and $O_2$ to a predetermined range at the time of atomization roasting, and quickly carrying out quenching after roasting.

In other words, the present invention makes it possible to mass-produce an ultra-fine soft ferrite raw material powder having a high purity, a high composition and a uniform particle diameter as the essential condition for the production of an ideal soft ferrite sintered body, by a high temperature oxidation method. The present invention provides also a method which provides a soft ferrite sintered having high performance and necessary characteristics by using this raw material as such or after regulating the particle diameter to a predetermined diameter by a so-called "build-up method". Thus, the present invention provides, in a sense, the necessary and sufficient conditions for the production of the ideal soft ferrite sintered body. In other words, the present invention accomplishes the control of the fine structure of the soft ferrite sintered body, which has been difficult by a so-called "break-down method" according to the prior art, without using a specific method such as HIP.

More concretely, the present invention provides a soft ferrite raw material powder produced by a high temperature oxidation method, characterized in that the proportions of Fe, Mn and Zn keep the composition range in which Fe is 65 to 85 wt % when calculated as $Fe_2O_3$, Mn is 10 to 30 wt % when calculated as MnO and Zn is 2 to 25 wt % when calculated as ZnO, the composition deviation is microscopically homogeneous, and the P and Cr contents as trace components satisfy the relation $P \leq 20$ ppm and $Cr \leq 50$ ppm. The present invention provides a sintered body obtained by conducting normal pressure sintering of the raw material described above, and a sintered body having a mean crystal particle diameter of not greater than 2 μm, obtained by directly granulating and molding the raw material and sintering at a normal temperature at a temperature not higher than 1,100° C. As to the production method of these products, the present invention stipulates the atmosphere as the sintering condition for the sintered body. As to the production of the raw material powder, the present invention stipulates the atomization condition of the chlorides to be sprayed and the cooling condition, and further stipulates the trivalent iron ion and impurities contained in the starting chloride solution. Furthermore, as to the production apparatus of these products, the present invention improves disposition of a burner, liquid spray nozzles and the angle of the slope portion at the furnace top, and prevents adhesion of solid matters.

BRIEF DESCRIPTION OF THE DRAWINGS

FIGS. 1(A) and 1(B) are diagrams showing a microdeviation of three primary components (Fe—Mn—Zn) of soft ferrite raw material powder;

BEST MODE FOR CARRYING OUT THE INVENTION

Figure 2:
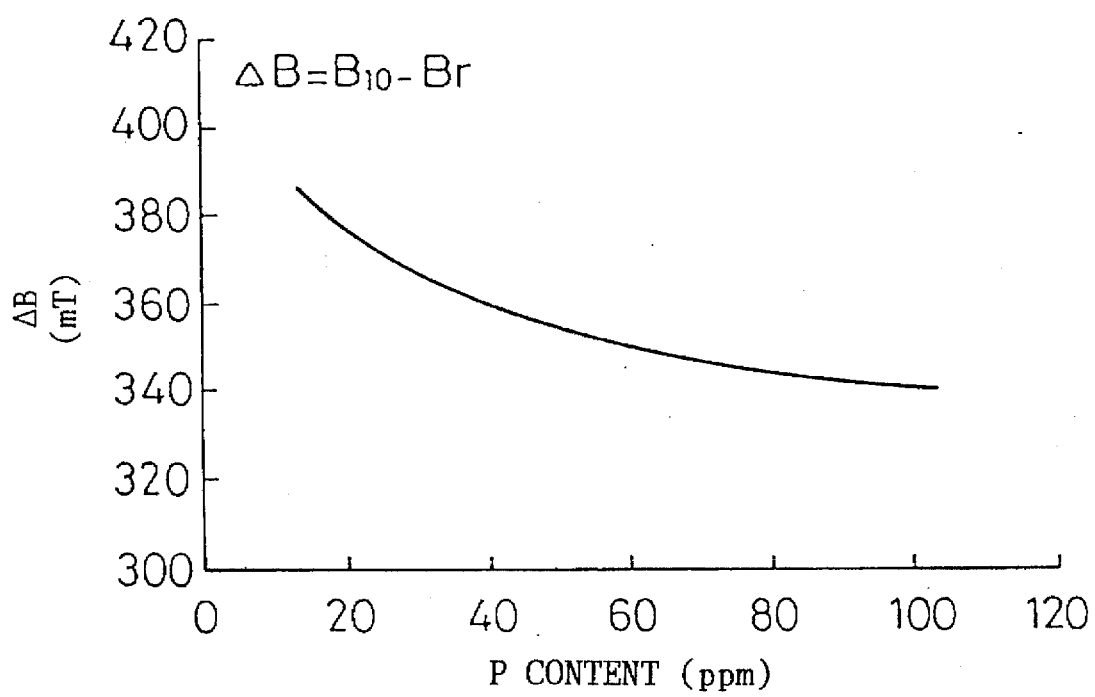
FIG. 2 is a diagram showing the relation and influence of a phosphorus content on ferrite raw material powder.

Hereinafter, the best mode for carrying out the present invention will be explained in detail. The method of producing ferrite according to the present invention has been accomplished by examining a sintering method of raw material mixed powder by a solid phase reaction, and a solution thermal decomposition method by a liquid phase reaction in the aspect of raw material powder as described already. In the sintering process as the next process step, properties of raw material powder exert great influences and particularly, the relation between the mean crystal size and the sintering density is remarkable. In other words, when the means crystal size is small, the sintering density increases by sintering for a short period and the subsequent change is small. When the chemical composition of powder is the same, its homogeneity exerts great influences on the behaviour in the sintering process and on the magnetic characteristics of the ferrite core as the product. The present invention has succeeded in accomplishing homogeneity of the chemical composition in raw material powder and miniaturization of the mean crystal size by improving a powder production method.

FIG. 1 shows micro-deviation of three primary components (Fe—Mn—Zn) of soft ferrite raw material powder by pulverizing and mixing predetermined amounts of iron oxide, manganese oxide and zinc oxide powder. FIG. 1(A) shows the micro-deviation of the three primary components (Fe—Mn—Zn) of the soft ferrite raw material powder according to the present invention, and FIG. 1(B) shows the micro-deviation of the three primary components (Fe—Mn—Zn) of the soft ferrite raw material powder according to the prior art. Each analysis sample is prepared by molding each powder sample into a disc shape, burying it into a resin and mirror finishing the sample surface. The composition is analyzed by an X-ray microanalyzer scanned and computer-processed in every 0.16 μm. The result of analysis reveals that the deviation can be improved to $1/7$ to $1/6$ of the prior art in $Fe_2O_3$, $1/10$ to $1/4$ of the prior art in MnO and $1/8$ to $1/3$ of the prior art in ZnO, in the present invention. This result clearly demonstrates homogeneity of the soft ferrite raw material powder of the present invention. Moreover, the soft ferrite raw material powder is produced by a method which has by far higher mass-producibility than the prior art method using a hydrothermal synthesis method.

Conventionally, the soft ferrite raw material powder uses $Fe_2O_3$, $Mn_3O_4$ and ZnO as the primary components and $SiO_2$, CaO, etc., as sub-components. These components are mixed and pulverized and are then calcined at a temperature within the range of about 900° to about 1,100° C. to provide the raw material powder.

To obtain a soft ferrite raw material powder having a predetermined particle size (so-called "calcined powder"), the raw material powder so calcined are treated for a long time by a pulverization/dispersion apparatus such as a ball mill after calcination, but such an operation is likely to result in deterioration of a particle size distribution and in mixture of impurities.

The particle sizes of the main and sub-components of the raw material powder range from several microns to several hundreds of microns.

Figure 3:
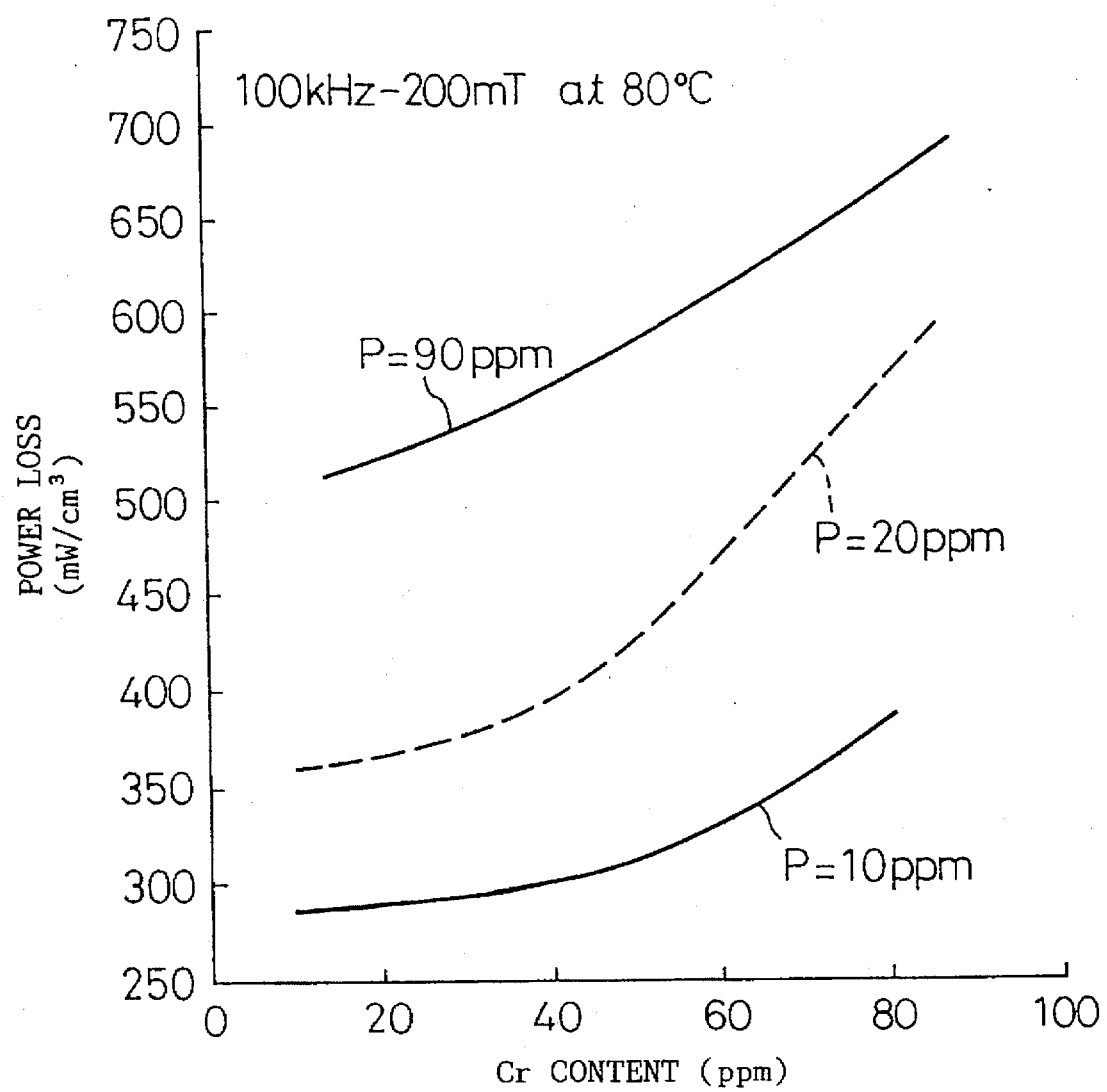
FIG. 3 is a diagram showing the relation and influence of a chromium content on ferrite raw material powder.

The soft ferrite raw material powder must keep the composition in which the Fe, Mn and Zn proportions are from 65 to 85 wt % when calculated as $Fe_2O_3$, from 10 to 30 wt % when calculated as MnO and from 2 to 25 wt % when calculated as ZnO, respectively, the composition deviation must be microscopically homogeneous, and the contents of P and Cr as the trace components must satisfy the relation P≦20 ppm and Cr≦50 ppm. Experiments are carried out using the ferrite raw material powder so as to examine the influences of phosphorus, chromium, etc., as shown in FIGS. 2 and 3. FIG. 2 shows the relation between ΔB and the P content. Here, ΔB represents the difference between $B_{10}$ (saturation flux density in external magnetic field of 10 Oe) and Br (residual flux density) in a magnetization curve, and this represents a magnetization allowable range in a switching power supply, etc. FIG. 3 shows the relation between the power loss and the Cr content corresponding to each P content. As a result, it has been found out that phosphorus must be limited to not greater than 20 ppm and chromium, to not greater than 50 ppm.

The reason why the particle size of the soft ferrite raw material powder according to the present invention is limited to not greater than 0.1 μm will be explained.

The phenomenon occurring with sintering of the raw material powder will be described as follows in the aspects of the particle size and the components, as is well known in the art (refer to "Electronic Material Series", published by Maruzen, Nov. 30, 1986).

When n powder particles having a mean diameter $d_1$ and component variance δ between the particles are molded and the crystal particle size of the sintered body obtained by sintering these powder particles is $d_2$, the following can be concluded:

Composition variance between the sintered crystal particles diminishes to $\delta/(n)^{1/2}$; with the proviso that $n=(d_2/d_1)^3$ In order to obtain a sintered body having small composition variance, the composition of the raw material powder particles must be homogeneous and must be fine. The finer the structure of the sintered body, the smaller the particle size of the raw material powder, and this is also an essential condition so as to secure performance of the ferrite sintered body.

Also, it is well known that the smaller the particle size of the powder material as the material for the sintered body, the greater becomes its surface energy and the higher becomes its reactivity.

However, if reactivity is excessively high, air bubbles are entrapped into the crystal particles during the progress of the sintering reaction, and a sound sintered body cannot be obtained.

Particularly when a spinel structure is partially decomposed into hematite in the case of the soft ferrite raw material powder, reactivity at this portion becomes high. Accordingly, the spinel conversion ratio of the raw material powder must be high. In the case of the soft ferrite raw material powder of the present invention having a particle size of not greater than 0.1 μm, the spinel conversion ratio of at least 95% in terms of the peak area ratio of X-ray diffraction is secured, and homogeneity for the microscopic sintering reaction is also maintained.

In the aspect of the production method of the ferrite sintered body as the second invention of the present invention, too, it is another characterizing feature of the present invention that the mean particle size of the raw material calcined powder is not greater than 0.1 μm and under this condition, granulation molding is directly applied as described already. The sintering temperature is set to not higher than 1,100° C. when this sintered body is obtained for the following reason. If sintering is made at a higher temperature than this temperature, grain growth takes place and the particle size of the sintered body becomes greater than 2 μm. The atmosphere at the time of temperature elevation is limited to a nitrogen atmosphere having an oxygen content of not greater than 100 ppm. For, if the oxygen content is greater than 100 ppm, a compact sintered body cannot be obtained, or $\alpha$-$Fe_2O_3$ is generated in some cases, so that the ferrite single phase cannot be obtained.

A sintered body having a crystal particle size of from 2 to dozens of microns can be obtained by sintering the raw powder having a particle size of not greater than 0.1 μm as such to a temperature of 1,100° to 1,350° C. while keeping the sintering atmosphere described above.

Alternatively, a sintered body having a sintering density of at least 4.9 g/cm$^3$ and a crystal particle size of from 2 to dozens of microns can be obtained, too, by conducting heat-treatment at 200° to 900° C. to obtain so-called "buildup particles", and thereafter carrying out shredding, granulation and molding in a known sintering atmosphere.

Figure 4:
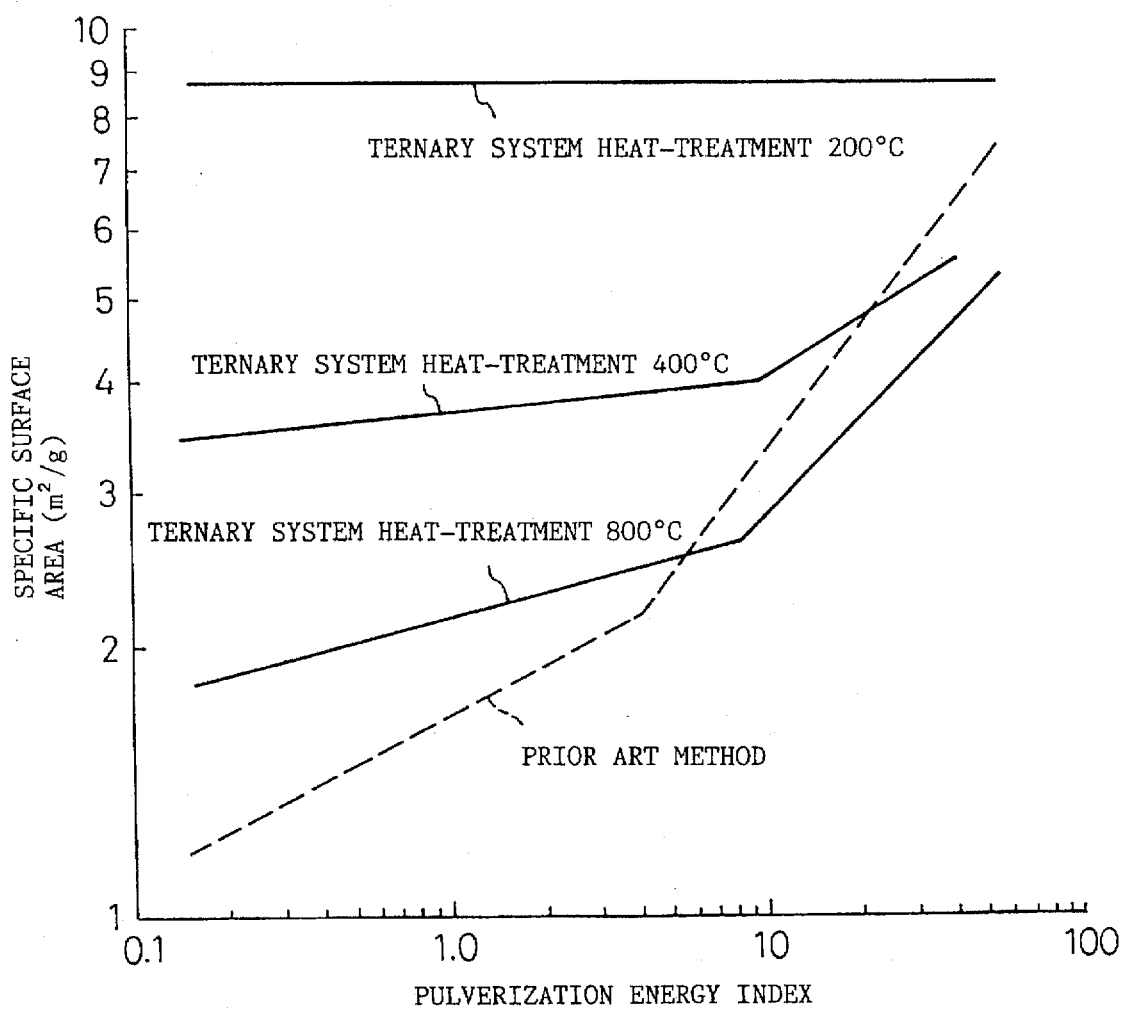
FIG. 4 is a diagram showing the relation between a pulverization energy index of soft ferrite powder according to the present invention and its specific surface area.

FIG. 4 illustrates the pulverization (shredding) condition of the soft ferrite raw material powder by plotting the pulverization energy index in consideration of the treatment time, the ball quantity for pulverizing the treated powder, etc., on the abscissa and the pulverization result (specific surface area) on the ordinate.

This diagram illustrates the change of the particle diameter by the specific surface area measured by an adsorption method when ordinary soft ferrite raw material powder and the soft ferrite raw material powder according to the present invention are heat-treated at temperatures of 200°, 400° and 800° C. so as to allow the grain growth and are thereafter treated for a predetermined time by a wet system dispersion apparatus, respectively.

The particle size becomes small (the specific surface area becomes great) with the passage of the treating time, and this change ratio of the particle size becomes drastically high above a certain charging quantity of pulverization energy. This tendency is more remarkable in the soft ferrite raw material powder according to the prior art method, and corresponds to the occurrence of ultra-fine powder due to excessive pulverization and to the deterioration of the particle size distribution. This fact represents the limit of the particle size control of the ordinary soft ferrite raw material powder using iron oxide, manganese oxide and zinc oxide powder as the raw materials or the soft ferrite raw material powder by a so-called "break-down" method.

In contrast, the present invention can easily increase the particle size to the necessary particle size by the particle size control by the so-called "build-up method" as represented by the example wherein the raw material powder below 0.1 μm is used as the base and is treated at a temperature ranging from 200° to 800° C.

The powder so built up is a loose aggregate and can be converted to raw material powder having a sharp particle size distribution by the treatment for a short time. The input range of pulverization energy, which does not invite the occurrence of abnormal ultra-fine powder, is broad, and desired soft ferrite raw material powder can be easily produced.

In other words, it is still another characterizing feature of the present invention that the invention can provide soft ferrite raw material powder having a sharp particle size distribution from fine powder of below 0.1 μm up to the range equal to ordinary calcined powder, and having homogeneous components.

To sinter the powder and to obtain a sintered body having a high density, the following must be taken into consideration.

To increase the compacting rate with sintering, the particle size of powder is preferably small. If the powder is too fine, however, a molding density drops and hence, the sintering density drops. If the particle size is too great, on the other hand, sinterability drops, although the molding density becomes high. Accordingly, a sintered body having a high density can be obtained by using an optimal particle size by taking both moldability and sinterability into consideration.

If the particle size distribution is broad, the shrinkage rate between the particles is different depending on the positions and rearrangement of particles occurs, so that pores are left. For, the approaching speed of the center of the powder particles when the neck grows becomes greater when the particle is smaller due to the volume diffusion and the grain boundary diffusion.

If heterogeneity of the chemical composition exists in the soft ferrite raw material powder, the sintering rate in the sintering process becomes higher than at the homogeneous portion, and generates locally the difference of the sintering rates. Consequently, shrinkage becomes non-uniform and pores are formed. Further, the fine crystalline structure of the sintered body becomes heterogeneous and electromagnetic characteristics get deteriorated, as well. Large pores are formed in some cases due to the Kirkendall effect.

The ordinary soft ferrite raw material powder is produced by mixing iron oxide, manganese oxide and zinc oxide, calcining the mixture at a high temperature of 900° to 1,100° C. and thereafter pulverizing the mixture. However, sintering between the particles proceeds firmly from both aspects of high temperature sintering and sintering between the particles of the different components, and the neck which cannot be separated even by pulverization are formed.

In this case, large gaps are formed between the aggregate particles at the time of molding, and they remain even after sintering and lower the density of the sintered body.

In the soft ferrite raw material powder according to the present invention and in the soft ferrite raw material powder built up from this powder material, homogeneity of the individual particles and homogeneity between these particles are extremely high, the particle size distribution is narrow and sharp, the formation of the neck does not exist between the particles and the independent particles without the aggregate are formed. For these reason, these raw material powders can form an extremely homogeneous sintered body devoid of the abnormal grain growth and having an extremely high density.

The HIP method can produce a compact sintered body approximate to a true density by low temperature sintering. In pressure-sintering, when a pressure is applied to a dust powder body, the driving force for compacting can be improved due to the mechanisms such as rearrangement of the particles, diffusion creep, plastic fluidization, etc., and fine granulation of the crystal particles and compacting of the sintered body can be simultaneously accomplished by the application of low temperature sintering. However, when the soft ferrite raw material powder of the present invention is used and the particle size is adjusted optimally, a high density sintered body equivalent to the HIP material can be easily obtained without applying the pressure as required in the HIP method.

The production of the soft ferrite raw material powder by the high temperature oxidation reaction (atomization roasting) of the Fe, Mn and Zn chloride aqueous solution according to the present invention generally proceeds through the following steps.

Atomization of the metal chloride aqueous solution into the roasting furnace and the progress of the high temperature oxidation reaction;

Co-existence of the Fe—Mn—Zn ternary component system metal oxide as the reaction product and hydrogen chloride gas, steam, etc., as a mixture;

Separation and recovery of the ternary component system metal oxide containing Fe—Mn—Zn from the hydrogen chloride gas.

In other words, it becomes necessary to separate the metal oxide and the hydrogen chloride gas under the high temperature oxidation condition which restricts the residual chlorides and under the condition which restricts the chlorination reaction of the Fe—Mn—Zn ternary component system metal oxide in the co-presence of hydrogen chloride.

The following reaction schemes may be conceived for the decomposition and oxidation reaction from the metal chloride to the metal oxide by $O_2$ and/or $H_2O$:

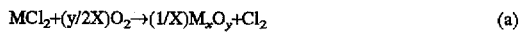(a)

(b)

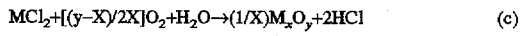(c)

where M represents a divalent metal element such as Fe, Mn, Zn, etc.

Figure 5:
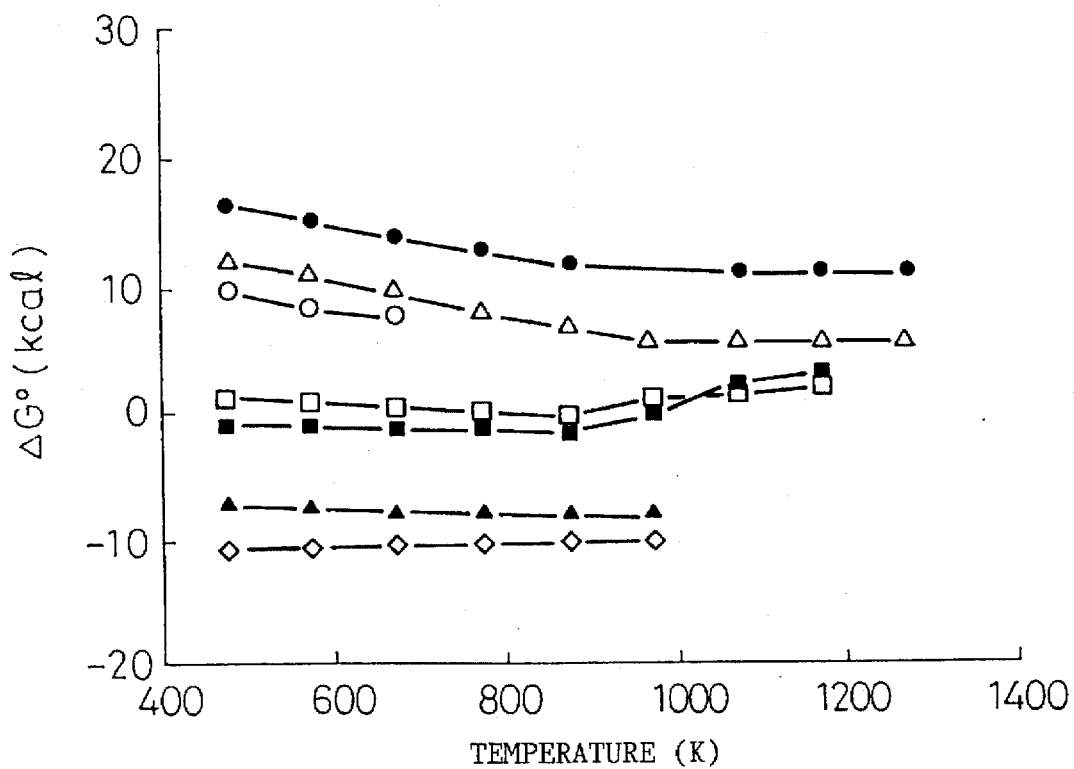
FIG. 5 is a diagram showing the relation between standard generation free energy of the reaction of a metal chloride and oxygen and the temperature.

FIG. 5 shows standard formation free energy of the reaction (a). The diagram represents that there is the possibility that the oxidation reaction of the iron chloride of the formulas (6) and (7) in FIG. 5 proceeds easily, and this reaction is utilized for forming high purity iron oxide by oxidation roasting of iron chloride crystals in air on the industrial basis.

The formula (4) in FIG. 5 represents the possibility of the formation of manganese oxide by oxidation roasting of manganese chloride in air.

The decomposition/oxidation reaction of the aqueous solution of chloride by roasting is believed to proceed in accordance with the reaction scheme (b) and/or (c).

Figure 6:
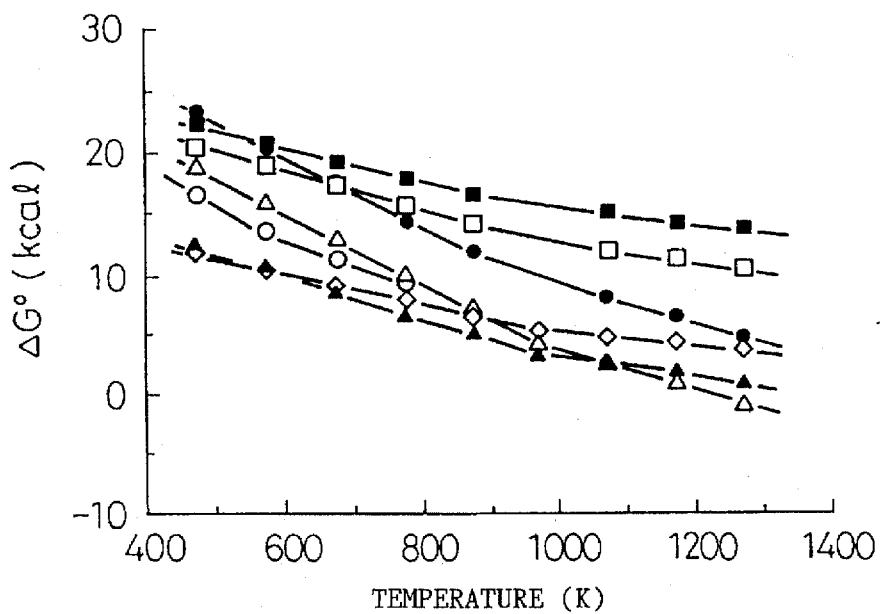
FIG. 6 is a diagram showing the relation between standard generation free energy of the reaction of the metal chloride and water, and the temperature.

FIG. 6 shows standard formation free energy of the reaction (b), and demonstrates that the oxidation reaction of the Fe, Mn and Zn chlorides does not proceed easily by only the contribution of the vapor. Speaking relatively, there is the possibility that oxidation of the Fe chloride proceeds most easily in the (b) reaction, and that Mn is most difficultly oxidized.

Figure 7:
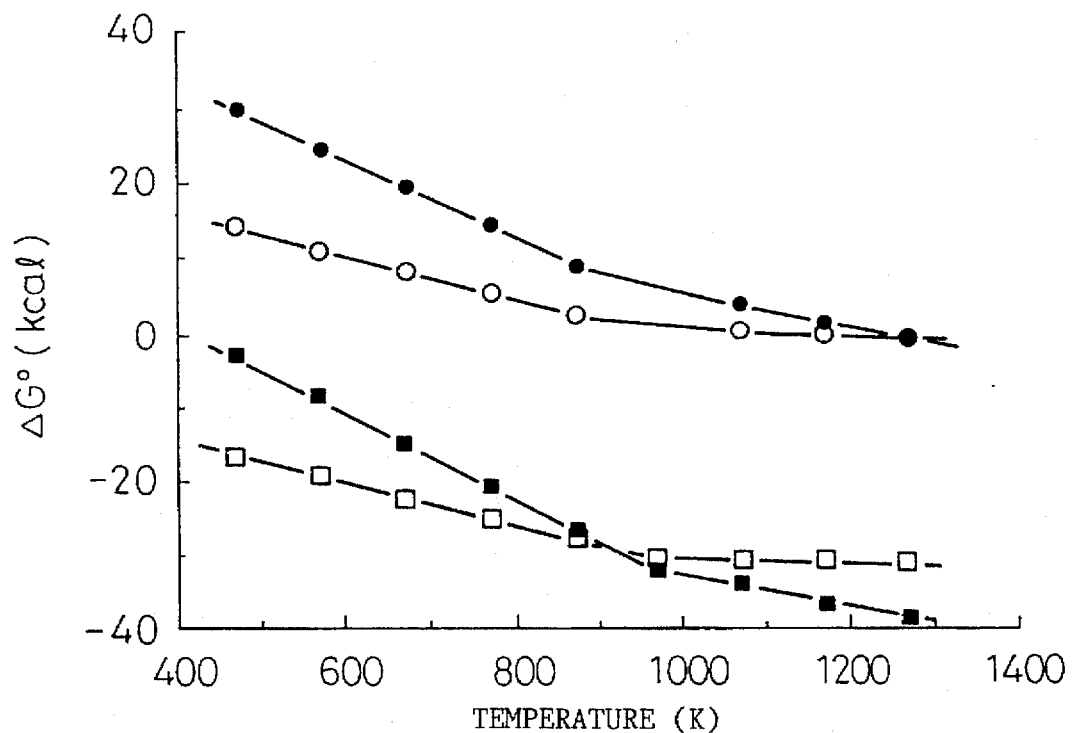
FIG. 7 is a diagram showing the relation between standard generation free energy of the reaction of the metal chloride, oxygen and water, and the temperature.

FIG. 7 shows standard formation free energy of the reaction (c). The diagram represents that there is the possibility that oxidation of the Fe chloride proceeds easily and that oxidation of the Mn chloride is obviously more difficult to proceed than Fe. However, the oxidation reaction of the Mn chloride is possibly easier to proceed in the (c) formula than in the (b) formula.

As to the formation of iron oxide ($Fe_2O_3$) by roasting of the ferrous chloride ($FeCl_2$) aqueous solution, the reaction is stable without undecomposed residual iron chloride. Industrially, too, recovery of HCl by the roasting treatment of the spent acid of steel and recovery of $Fe_2O_3$ as the by-product have been carried out broadly, and this fact supports the result of examination of the equilibrium theory.

$Fe_2O_3$ has high stability in the HCl environment and the chlorination reaction hardly takes place. Even when a mixture of $Fe_2O_3$ with other metals (e.g. $MnFe_2O_4$, $MgFe_2O_4$, $CuFe_2O_4$) is reacted in 1%HCl—$N_2$ at a temperature not higher than 350° C., the iron component is not chlorinated in the same way as when iron oxide is used alone, and other metals form a divalent metal chloride. This fact, too, represents stability of iron oxide ($Fe_2O_3$) to the hydrogen chloride gas (Transactions of Japan Chemical Society, No. 11, (1977), 1728-36).

In other words, in the formation reaction of the Fe—Mn—Zn ternary component system metal oxide, promotion of the oxidation reaction of the manganese and zinc chlorides and prevention of the manganese and zinc oxides in the reaction product from reacting co-present hydrogen chloride and becoming again the chloride are very important from the investigation of the equilibrium theory and from the practical reaction.

Figure 8:
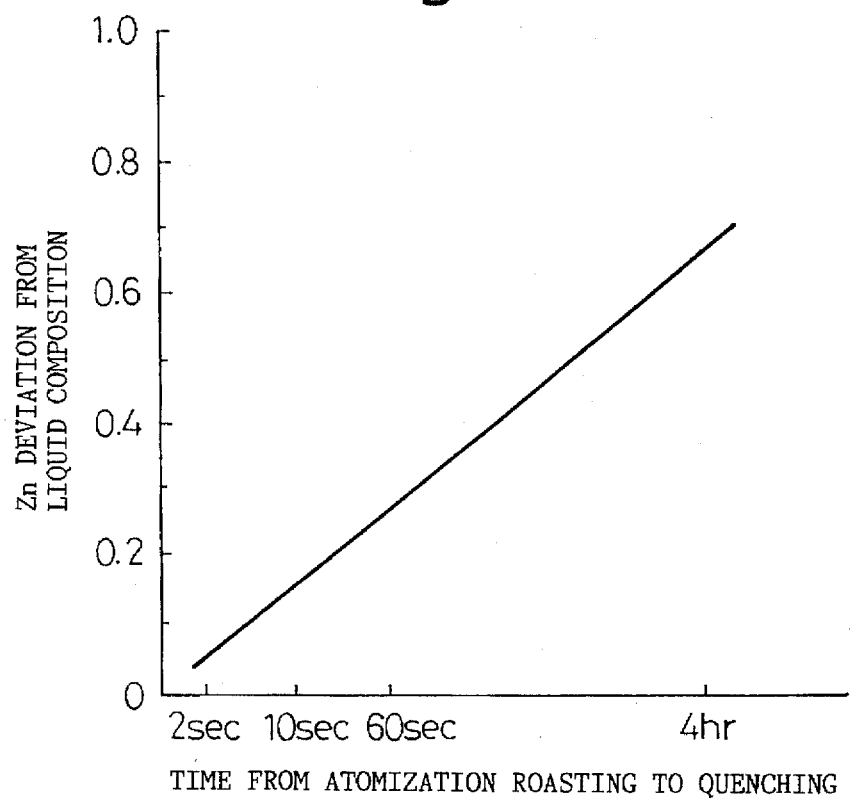
FIG. 8 is a diagram showing the relation between the time from atomization roasting till quenching and ZnO deviation with a liquid composition.

The fifth invention of the present invention, wherein the diameter of the atomized droplets sprayed from the spray nozzle is set to be not greater than 200 μm and the droplets are immediately cooled to a temperature not lower than the acid dew point but not higher than 400° C. immediately after atomization roasting and within 10 seconds by a cooling medium containing $H_2O$ and/or $O_2$, will be explained with reference to FIGS. 8 and 9. FIG. 8 is a correlational diagram showing the relation between the time from atomization roasting to cooling and the ZnO deviation, that is, the difference of the Zn content between the liquid composition and the reaction product as calculated in terms of ZnO. The longer the time from atomization roasting to cooling, the greater becomes the ZnO deviation, as can be understood from the diagram.

The reason is assumed as follows. When the powder material is left standing for a long time in the chlorine and/or hydrogen chloride gas after roasting while being kept at a high temperature, the zinc portion in the resulting oxide powder material changes to the chloride, and results in the increase of the residual chloride or the ZnO deviation.

It is therefore necessary to cool the reaction product to 400° C. or below after the reaction is completed, and to stop the reaction in the practical meaning of the term. This time is within 10 seconds.

One of the causes for the occurrence of the ZnO deviation is the high vapor pressure of the zinc chloride, and one of the requirements for preventing the deviation due to this high vapor pressure is quenching to 400° C. or below at which $ZnCl_2$ is hardly converted to the vapor, at the time of cooling by using the cooling medium containing $H_2O$ and/or $O_2$.

When hydrogen chloride in the atmosphere changes to hydrochloric acid due to dewing after quenching, it quickly converts the oxide to the chloride and increases the residual chloride. Therefore, the temperature higher than the acid dew point must be secured.

Figure 9:
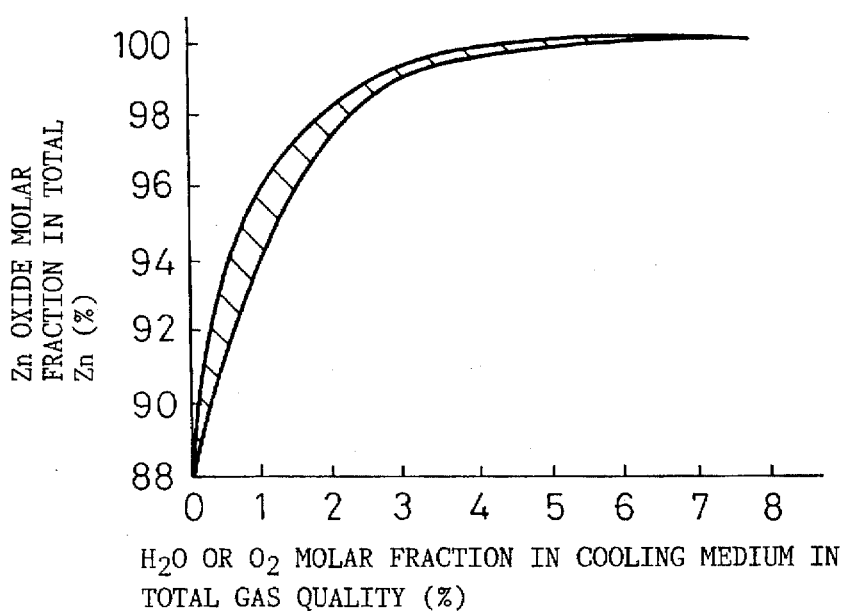
FIG. 9 is a diagram showing the relation between a $H_2O$ or $O_2$ molar fraction of a cooling medium and Zn oxide molar fraction in whole Zn.

FIG. 9 shows the relation between the molar fractions of $H_2O$ and/or $O_2$ in the cooling medium with respect to the total gas amount and the molar fraction of the Zn oxide in total Zn. The oxidation of Zn does not proceed when the molar fraction of $H_2O$ and/or $O_2$ in the cooling medium with respect to the total gas amount is smaller.

The molar fraction of $H_2O$ and/or $O_2$ in the cooling medium in the total gas amount is preferably higher, but if it is at least 3%, no practical problem occurs.

Table 1 illustrates the chloride concentration by the chemical analysis value of the powder collected by a specific on-line sampling apparatus which restricts the oxidation reaction and the re-chlorination reaction in the sampling process of the powder when the Fe—Mn—Zn chloride aqueous solution is roasted.

TABLE 1

|  | medium stage of roasting furnace | lower stage of roasting furnace | outlet of roasting furnace | after quenching in the present invention |
| --- | --- | --- | --- | --- |
| atmosphere temperature °C. | 850 | 800 | 750 | 400 |
| $FeCl_2$ wt % | 1.5 | 0 | 0 | 0 |
| $MnCl_2$ wt % | 1.8 | 1.7 | 1.7 | 1.7 |
| $ZnCl_2$ wt % | 1.3 | 1.2 | 1.0 | 0 |

Table 1 and FIG. 9 demonstrate that the residual chlorides, particularly zinc chloride, can be reduced by conducting cooling by using the cooling medium containing $H_2O$ and/or $O_2$ immediately after roasting but not by mere heat-exchange or cooling using $N_2$, or the like.

The reason why the Mn chloride does not change after quenching in Table 1 is because the temperature at the time of quenching is too low, and it is assumed that the reaction does not sufficiently proceed even though the necessary amount of $H_2O$ and/or $O_2$ for the reaction exists.

When the diameter of the atomized droplets is greater than 200 μm, the occurrence of the aggregate particles of the resulting oxide increases, and because the retention time in the reaction region is different depending on the particle size, the ZnO deviation increases for the reason shown in FIG. 8.

Accordingly, in order to promote the oxidation reaction of the chloride, to prevent the resulting oxides from reacting with hydrogen chloride co-present in the reaction system and changing again to the chloride and to prevent its sublimation, it is necessary to set the diameter of the atomized liquid droplets to not greater than 200 μm, to conduct cooling by using the cooling medium containing $H_2O$ and/or $O_2$ to 400° C. or below immediately after atomization roasting, to complete this cooling operation within 60 seconds and preferably within 10 seconds, and to keep the recovered powder at a temperature higher than the acid dew point, and they are the essential conditions for restricting the ZnO deviation.

Figure 10:
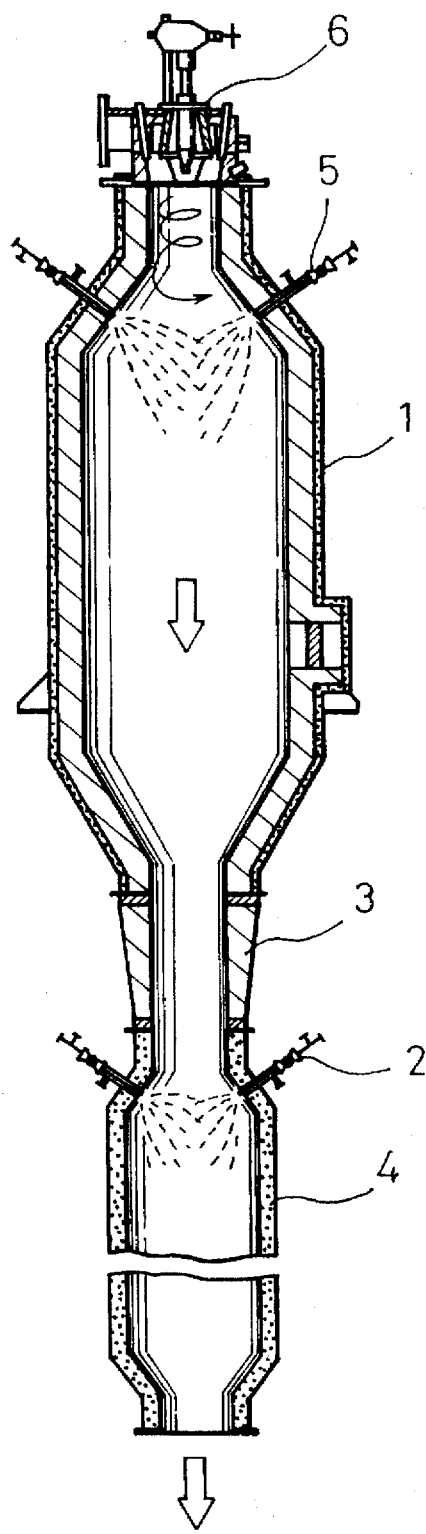
FIG. 10 is a schematic explanatory view of an apparatus for practicing the present invention.

FIG. 10 is a schematic explanatory view of the apparatus for practicing the present invention. Reference numeral 1 denotes an atomization roasting furnace. A vertically elongated cylindrical furnace lined with a refractory is used as the atomization roasting furnace 1, and a quencher 4 is disposed adjacent to this furnace 1. The quencher 4 is connected at its lower portion to the lower portion of the atomization roasting furnace 1 through a passage 3, and quencher nozzles 2 capable of quenching immediately after atomization roasting are disposed at the end portion of the quencher 4 in the circumferential direction of the quencher 4.

On the other hand, raw material spray nozzles 5 for spraying the chloride mixed solution as the starting material are disposed at the top of the atomization roasting furnace in the circumferential direction in such a manner as to encompass a center burner 6. Because the center burner 6 and the raw material spray nozzles 5 are disposed in juxtaposition in this way, the aqueous solution from the raw material spray nozzles is not directly sprayed to the center burner. For this reason, the combustion flame is not quenched, and the raw material mixed solution concurrently mixes with the gas after completion of burning from around the center burner.

Accordingly, a high velocity gas flow which improves mixing can be obtained, and the mixed solution of the starting chlorides is sprayed into the high velocity high temperature gas inside the furnace from the spray nozzles 5. In this instance, the maximum particle size of the atomized droplets is not greater than 200 μm and preferably, within the range of 5 to 150 μm. The particle size of the droplets is the value at normal temperature. The mixed solution so sprayed quickly mixes with the high temperature swirl gas flow and is collectively held at the predetermined reaction temperature by the latent heat of vaporization and the heat of decomposition, so that decomposition of the metal salts proceeds. The reaction temperature in this case is from 600° to 1,000° C. and preferably, from 750° to 900° C. If the temperature is less than 600° C., crystallization to the spinel structure, which is directed to obtain ferrite, hardly proceeds, and the retention time must be prolonged. If the retention time is prolonged, zinc spinel is again chlorinated and the zinc deviation increases. If the temperature exceeds 1,000° C., on the other hand, vaporization becomes quick if the starting materials contain volatile materials, and suitable quenching time of the reaction product, formed due to decomposition in the gaseous phase, by the cooling medium containing $H_2O$ and/or $O_2$ becomes shorter than 60 seconds, and the problem occurs.

On the other hand, the retention time is preferably as short as possible, as already described, and is not longer than 10 seconds and preferably, from 0.1 to 5 seconds. The mixture of the resulting fine particles after decomposition of the metal salts in the roasting furnace and the high temperature gas is cooled by water sprayed from the quencher nozzles 2, which are disposed at the end portion of the quencher 4 in the circumferential direction in the same way as in the roasting furnace. The resulting fine particles are separated from the gas and are collected by a cyclone or an electric dust collector (not shown). In this case, adsorbed hydrogen chloride is converted to hydrochloric acid due to dewing after quenching, so that the oxide is quickly chlorinated to the chloride. To avoid this problem, the internal temperature of the quencher 4 is held at a temperature higher than the acid dew point, and hydrogen chloride is recovered and is used as the recovered acid in the customary manner.

Further, the ninth invention according to the present invention relates to an atomization roasting method capable of obtaining soft ferrite raw material powder having an extremely small residual chlorine content, which has sufficiently undergone the oxidation reaction, by keeping the $H_2O$ and $O_2$ amounts within a predetermined range at the time of atomization roasting and by conducting quenching immediately after roasting. In other words, if the $H_2O$ molar fraction is less than 5% and moreover, the $O_2$ molar fraction is less than 2% during the reaction, oxygen necessary for the oxidation reaction of the metal chlorides, particularly manganese chloride, cannot be secured, and the residual chlorine content in the powder after atomization roasting drastically increases. When the $H_2O$ molar fraction is not smaller than 5% and the $O_2$ molar fraction is not smaller than 2%, the oxidation reaction of the metal chlorides is sufficiently carried out, and the residual chlorine content exists at the level which renders no practical problem.

The reason will be explained below.

The decomposition oxidation reaction readily proceeds for iron chloride as described already. As to zinc chloride, too, quenching by using the cooling medium containing $H_2O$ and/or $O_2$ can promote the oxidation and/or prevent the re-chlorination reaction.

In the case of manganese chloride, however, the oxidation reaction level is primarily determined in the high temperature condition at the initial stage of atomization if the sufficient amounts of $H_2O$ and/or $O_2$ necessary for the oxidation exist, and the change of the oxidation level becomes small in whichever way the $H_2O$ and/or $O_2$ amounts may be thereafter changed. The result after quenching shown in Table 1 is assumed to result from the residue of the undecomposed manganese salts due to insufficiency of the $H_2O$ and/or $O_2$ concentration during the roasting reaction.

Figure 12:
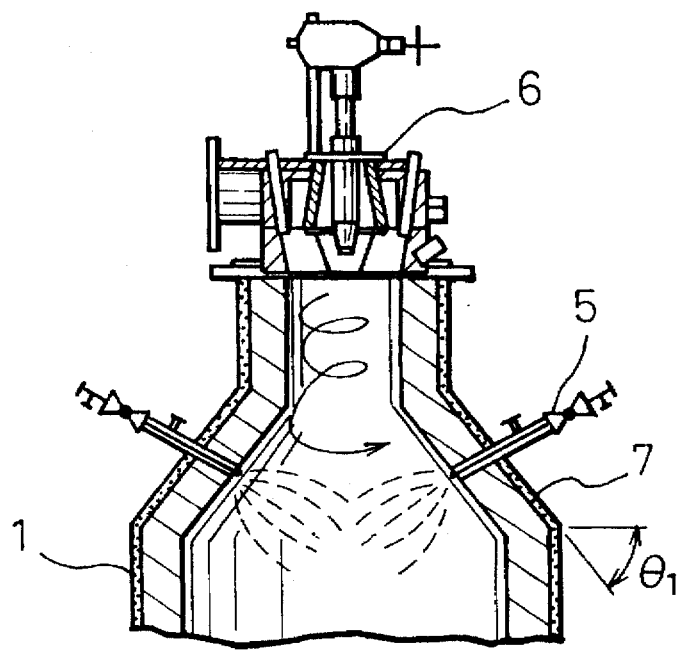
FIG. 12 is a schematic sectional view of an atomization roasting furnace for producing composite oxide ferrite powder according to the present invention.

Further, the burner structure of the atomization roasting furnace according to the present invention is shown in FIG. 12. In other words, FIG. 12 is a schematic sectional view of the atomization roasting furnace for producing the composite oxide ferrite powder according to the present invention. The center burner 6 is disposed at the furnace top of the atomization roasting furnace 1, and three or more liquid spray nozzles 5 are disposed in the circumferential direction of the center burner 6. The atomization roasting furnace 1 is of a vertical type, and the angle of its expansion slope portion at the furnace top is θ, which satisfies the relation θ≦50°. For, if the angle θ exceeds 50°, the length of the furnace top in the vertical direction increases and the approach distance of the combustion air swirl flow emitted from the center burner becomes great, so that the influences of the swirl flow remain near the lower portion of the nozzle holes of the furnace. Consequently, the droplets atomized once gather at the center portion of the furnace and the density of the droplets increases at the furnace center. The increase of the diameter of the droplets increases the force of inertia of the droplets and promotes collision of the droplets on the furnace wall and their adhesion on the furnace wall. For these reasons, the angle of expansion slope portion 7 of the furnace top is set to be not greater than 50°.

EXAMPLES

Next, the effects of the present invention will be explained in further detail with reference to Examples thereof.

Example 1

Ferrite calcined powder having a composition consisting of 71 wt % of $Fe_2O_3$, 22 wt % of MnO, 7 wt % of ZnO, 200 ppm of $SiO_2$ and 800 ppm of CaO, obtained by atomization roasting, and having a mean particle size of 400 Å, was produced. After granulation was made by adding 1.0% of PVA as a binder, the granulate was molded into a ring having an outer diameter of 29 mm, an inner diameter of 18 mm and a height of 7 mm. The resulting molded article was sintered for 4 hours under the sintering condition as set forth in claim 4. As a result, there was obtained a compact sintered body having a sintering density of at least 4.8 g/cm³. Table 2 tabulates the crystal particle size of the resulting sintered cores and their power loss values at 1 MHz–50 mT at 100° C. In Table 2, the mean crystal size was measured by polishing the sintered body and imaging the polished surface by an optical microscope. It can be understood that in Nos. 1 to 3 of the present invention, the mean crystal size was not greater than 2 μm. Comparative Examples 1 and 2 in the table represent the results of the sintered cores obtained by setting the sintering temperature to 1,200° C. and 1,300° C., respectively. It can be understood clearly from Table 2 that the sintered cores of the present invention had an extremely excellent power loss at a high frequency.

TABLE 2

| Sample No. | sintering temp. (°C.) | mean crystal size (μm) | power loss (kW/m³) |
|---|---|---|---|
| No. 1 of this invention | 1,000 | 0.8 | 295 |
| No. 2 of this invention | 1,050 | 1.4 | 280 |
| No. 3 of this invention | 1,100 | 1.9 | 260 |
| Comparative Example 1 | 1,200 | 4.5 | 720 |
| Comparative Example 2 | 1,300 | 10.5 | 1,450 |

Example 2

As a mixed solution of raw materials, an aqueous solution containing $FeCl_2$, which was obtained by concentrating $FeCl_2$ having a concentration of 24% to 40% by a heat recovery column, $MnCl_2$ and $ZnCl_2$ in a proportion of $Fe_2O_3$:MnO:ZnO=68.4:27.8:3.8 (wt %) calculated as the oxide, was prepared, and was sprayed as a solution having a maximum droplet diameter of 50 to 150 μm at normal temperature by using spray air in the roasting furnace shown in FIG. 10. The roasting temperature was set to 800° C., and the quenching time down to 400° C. was set to 2 seconds and 10 seconds in Examples of the invention and to 60 seconds and 4 hours in Comparative Examples. The result is shown in FIG. 8. It can be understood that in Comparative Examples wherein the quenching time was 60 seconds and 4 hours, the deviation of zinc increased extremely when compared with the method of the present invention, and particularly, zinc hardly existed in powder in Comparative Example wherein the interval of 4 hours existed before quenching.

As a result of analysis of the composition of the composite oxide obtained from an electric precipitation apparatus (EP) after quenching, the composition was found to be $Fe_2O_3$:MnO:ZnO=68.1:27.4:4.2 (wt %).

Example 3

As a mixed solution of raw materials, an aqueous solution containing $FeCl_2$, which was obtained by concentrating $FeCl_2$ having a concentration of 24% to 40% by a heat recovery column, $MnCl_2$ and $ZnCl_2$ in a proportion of $Fe_2O_3$:MnO:ZnO=68.4:27.8:3.8 (wt %) calculated as the oxide, was prepared, and was sprayed as a solution having a maximum droplet diameter of 50 to 150 μm at normal temperature by using spray, air in the roasting furnace shown in FIG. 10. The roasting temperature was set to 800° C. and the quenching time down to 400° C. was set to 5 seconds. Experiments were carried out for two cases, that is, the case where the $O_2$ molar fraction was 2%, 3%, 5%, 10% and 15% under the condition that the $H_2O$ molar fraction was kept constant at 10%, and the case where the $H_2O$ molar fraction was 2%, 5%, 10% and 15% under the condition that the $O_2$ molar fraction was kept constant at 7%.

Figure 11:
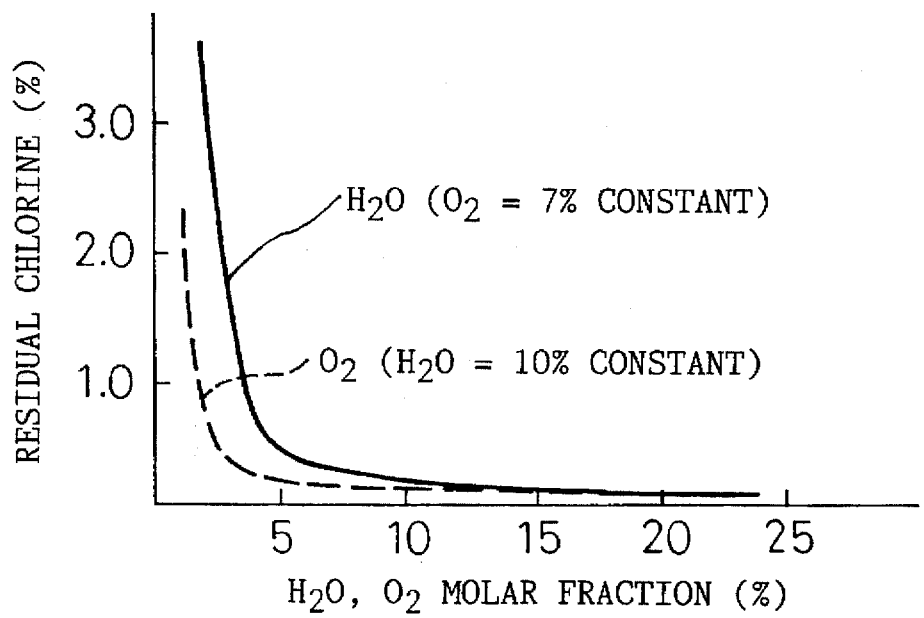
FIG. 11 is a diagram showing the relation between $H_2O$ and $O_2$ molar fractions and residual chlorine.

The result is shown in FIG. 11. This drawing shows the result obtained by changing the $H_2O$ and $O_2$ concentrations (fractions) in the reaction furnace, collecting the powder so produced after the reaction by the sampling method described above and conducting chemical analysis. The residual chlorine quantity was at the level which did not render any practical problem when the concentrations were at least 2% for $O_2$ and at least 5% for $H_2O$.

Example 4

Figure 13:
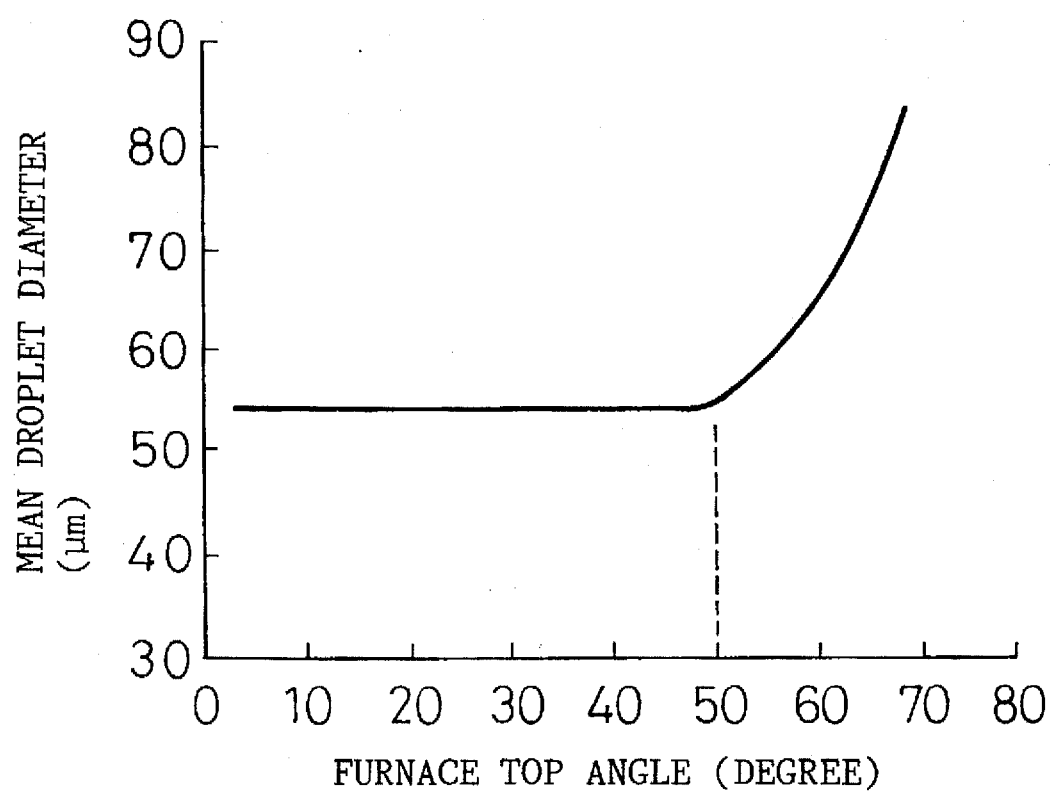
FIG. 13 is a diagram showing the relation between an angle of a furnace top and a mean liquid droplet diameter.

FIG. 13 shows the result of cold atomization in the roasting furnace obtained by changing the angle θ of the expansion slope portion of the top of the vertical atomization roasting furnace shown in FIG. 12 from 10° to 70° and disposing three liquid spray nozzles in the circumferential direction of the center burner. The mean diameter of the droplets in FIG. 13 was measured in accordance with a particle coating slide method by placing a glass plate coated with magnesium oxide powder at a lower portion, selectively guiding the droplets sprayed from above to the glass plate, magnifying the traces of the droplets remaining on the glass plate by an SEM, and photographing them. As shown in FIG. 13, when θ exceeded 50°, the mean liquid droplet diameter was likely to increase. Next, when the hot atomization tests were carried out using the expansion slope angles θ of 30° and 65° at the top of the atomization roasting furnace, respectively, the adhesion quantity of the powder on the wall surface of the roasting furnace was ½ of θ=65° when θ was 30°, and although the powder was fine powder of ternary system soft ferrite powder having high bonding powder, deposition of the powder on the inner wall of the furnace and near the nozzle did not at all occur, and clogging of the nozzles and disturbance of the gas flow inside the furnace did not either occur. Consequently, the operation could be carried out extremely stably. The drying time could be drastically reduced, too, and roasting for obtaining the ferrite and the yield could be improved.

As the testing condition, an aqueous solution containing $FeCl_2$, $MnCl_2$ and $ZnCl_2$ in the concentrations of 300 g/l, 80 g/l and 40 g/l, respectively, as the mixed solution of the raw materials, and the droplets of this solution by atomization air (pressure 5 kg/cm² G) was blown as a high velocity gas of 30 m/sec into the vertical furnace, and the reaction was carried out at the roasting temperature of 800° C.

Example 5

Figure 14A:
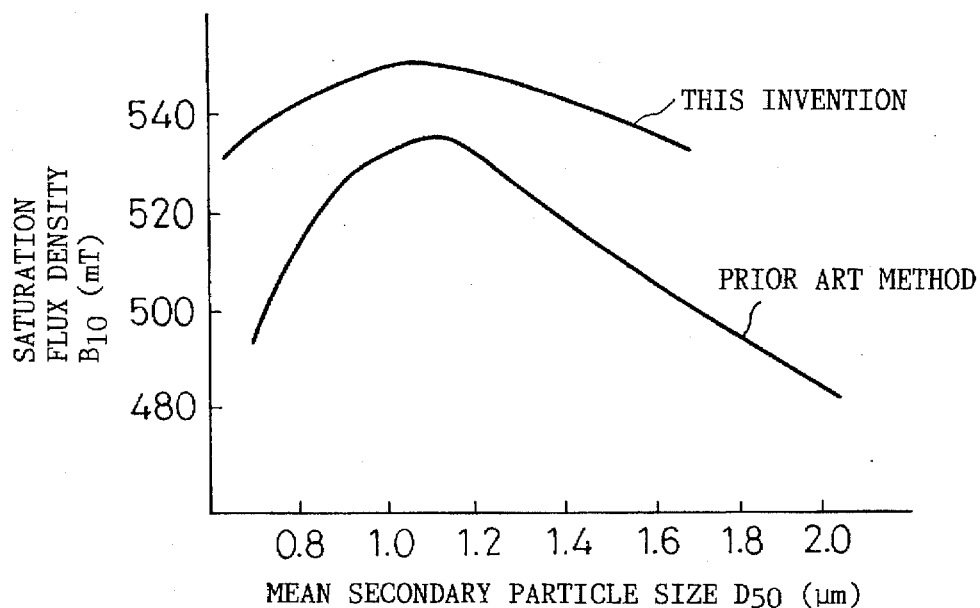
FIGS. 14(A) and 14(B) are diagrams showing saturation flux densities and power losses of soft ferrite cores according to the present invention and the prior art, respectively.
Figure 14B:
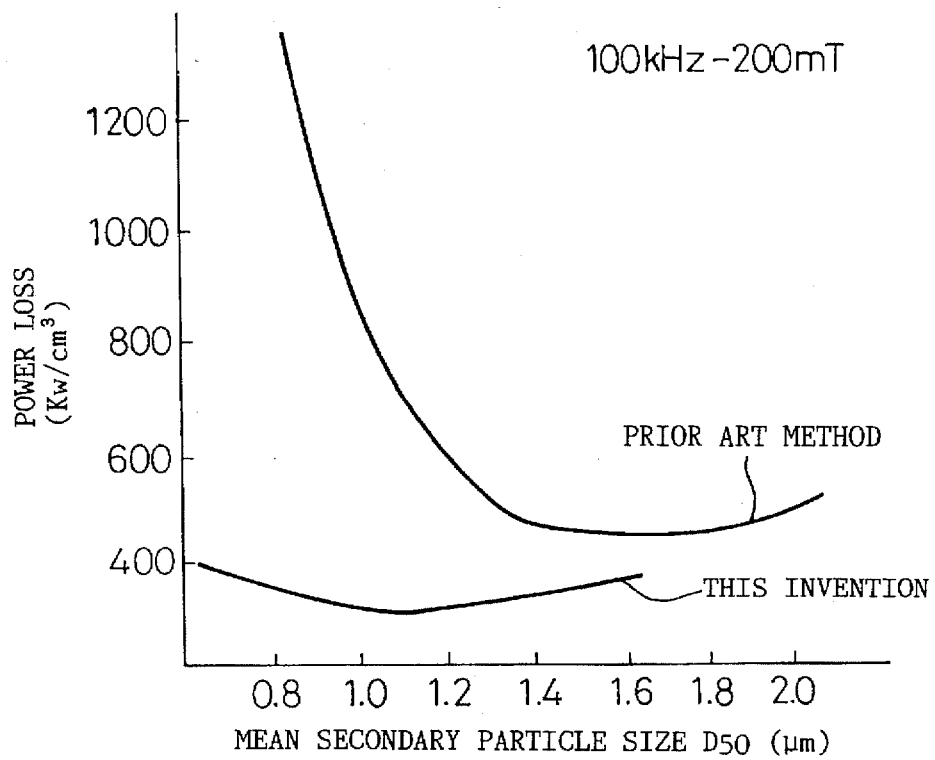

A ferrite raw material powder having the composition of 71 wt % of $Fe_2O_3$, 22 wt % of MnO, 7 wt % of ZnO, 150 ppm of $SiO_2$ and 600 ppm of CaO and having a mean particle size of 400 Å (primary particle diameter by SEM observation), and obtained by atomization roasting, was used as the raw material powder. After being directly granulated and shaped, the powder was sintered at a temperature of from 1,100° C. to 1,350° C. while regulating the roasting atmosphere in the customary manner, and a sintered body free from the abnormal grain growth and having a crystal size of not smaller than 2 µm could be obtained. If any improvement of moldability, etc., was necessary for mass-production as when the existing soft ferrite production step was as such used, heat-treatment of the powder was first conducted at 200° to 900° C. so as to grow the particles to the primary particle diameter of 0.3 to 1.0 µm, and pulverization (shredding) was conducted in order to control aggregation which exerted great influences on sinterability. In this way, soft ferrite raw material powders having various mean secondary particle diameters (micro-track particle diameters: $D_{50}$) could be obtained. FIG. 14 shows the saturation flux density and the power loss of each of the soft ferrite cores using the soft ferrite raw material powders of the present invention having a primary particle diameter of 0.3 to 0.7 µm and various mean secondary particle diameters and the soft ferrite cores obtained by sintering the conventional soft ferrite raw material powder using iron oxide, manganese oxide and zinc oxide as the raw materials by the known method. The core sintering temperature was 1,300° C. The raw materials produced by the so-called "build-up method" using the fine powder of the present invention as the base had high performance and high stability in a broad particle diameter range, and the materials of the present invention were superior to the conventional materials in the saturation flex density shown in FIG. 14(A) and in the power loss shown in FIG. 14(B).

Example 6

Particularly when the raw material powder obtained by heat-treating the soft ferrite raw material powder of the present invention at 400° C. so as to grow the particles was used as the starting material and the mean secondary particle diameter was controlled near to 1.1 µm, the core having a high density and high characteristics which could not be obtained in the past could be obtained. The electro-magnetic characteristics of the sintered body are tabulated in Table 3.

The sintered body had a high sintering density of 5.00 g/cm², almost devoid of pores and abnormal grain growth, and having a uniform particle diameter. In other words, the core having preferred characteristics, which were equivalent to those of the HIP sintered body, could be produced by the normal pressure sintering method.

TABLE 3

|  | sintering density g/cm³ | µi* | $B_{10}$ mT | power loss** mW/cm³ |
| --- | --- | --- | --- | --- |
| This invention | 5.00 | 2,200 | 550 | 300 |
| HIP | 5.02 | 2,300 | 553 | 340 |
| Prior art method | 4.85 | 1,900 | 490 | 450 |

*µi: initial permeability
**power loss: value at 100 KHz, 200 mT, 100° C.

Industrial Applicability

As can be clearly understood from Examples given above, the calcined powder produced by the conventional process or the calcined powder obtained by the so-called "break-down method" invites the deterioration of the characteristics due to the occurrence of very fine powder resulting from excessive pulverization, heterogeneity of the molded article due to the existence of hard aggregates, microscopic heterogeneity in both powder and composition which invites the abnormal grain growth of the sintered crystal, etc., but when the raw material powder of the present invention is employed, a homogeneous sintered body can be obtained easily. Another outstanding feature of the present invention is that when the soft ferrite raw material powder having a predetermined composition according to the present invention is used and the sintering condition of its molded article is controlled, the crystalline structure of the final sintered body can be controlled arbitrarily. For example, according to the present invention, a soft ferrite core having an excellent power loss in a high frequency range, particularly in the MHz range, can be produced easily, and the present invention is extremely effective for reducing the size of high frequency transformers.

From the aspect of the production method, too, the present invention can make the component deviation of the recovered powder extremely small with respect to the liquid composition of the high vapor pressure materials containing zinc, and can easily produce the soft ferrite raw material powder having a Zn concentration as high as 20 wt % or more due to the quenching effect using the cooling medium containing $H_2O$ and/or $O_2$. The present invention can reduce the quantities of the residual chlorides, can reduce the load to the adjustment of the components after roasting and to the dechlorination step and can further reduce the production steps.

From the viewpoint of the soft ferrite raw material powder, the quality grade of iron oxide, manganese oxide and zinc oxide as the starting material has been changed in the past in accordance with performance required for the soft ferrite. For this reason, the characteristics of powders become different, and the production method of the soft ferrite, from the treatment of the starting materials to the calcining condition, the granulation molding conditions, etc., must be delicately changed in accordance with required quality of the soft ferrite. Because at least the powder production condition of the soft ferrite raw material powder in the present invention can be applied in common to all the soft ferrites, the process management of the molding and sintering process becomes easier. Furthermore, because the primary components can be produced by a through-process, control of the impurity contents, etc., can be easily made in accordance with required quality, and this is advantageous from the process aspect. When the present invention is applied as described above, the present invention can simultaneously accomplish the drastic reduction of the production cost and stabilization and higher performance. Thus, the present invention provides an extremely remarkable practical effect.

We claim:

1. An Mn—Zn soft ferrite raw material powder produced by a high temperature oxidation method comprising 65–85 wt. % Fe, calculated as $Fe_2O_3$, 10–30 wt. % Mn, calculated as MnO, and 2–25 wt. % Zn, calculated as ZnO and a P and a Cr content of P≦20 ppm and Cr≦50 ppm and having a mean particle diameter of not greater than 0.1 μm and composition deviation of $Fe_2O_3$, MnO and ZnO is microscopically homogenous.

2. A soft ferrite sintered body produced by normal pressure sintering of a Mn—Zn soft ferrite raw material powder produced by a high temperature oxidation method, said Mn—Zn soft ferrite raw material powder comprising 65–85 wt. % Fe, calculated as $Fe_2O_3$, 10–30 wt. % Mn, calculated as MnO, and 2–25 wt. % Zn, calculated as ZnO, and a P and a Cr content of P≦20 ppm and Cr≦50 ppm and having a mean particle diameter of not greater than 0.1 μm and composition deviation of $Fe_2O_3$, MnO and ZnO is microscopically homogenous.

3. A soft ferrite sintered body produced by direct granulation molding and subsequent normal pressure sintering at a temperature below 1,100° C. of an Mn—Zn soft ferrite raw material powder produced by a high temperature oxidation method, said soft ferrite sintered body having a mean crystal particle diameter of not greater than 2 μm, said soft ferrite raw material powder comprising 65–85 wt. % Fe, calculated as $Fe_2O_3$, 10–30 wt. % Mn, calculated as MnO, and 2–25 wt. % Zn, calculated as ZnO, and a P and a Cr content of P≦20 ppm and Cr≦50 ppm and having a mean particle diameter of not greater than 0.1 μm and composition deviation of $Fe_2O_3$, MnO and ZnO is microscopically homogenous.

4. A method for producing a soft ferrite sintered body in a sintering process, said soft ferrite sintered body having a mean crystal particle diameter of not greater than 2 μm, comprising the steps of:

obtaining a soft ferrite powder by spray roasting of an Mn—Zn type soft ferrite raw material powder produced by a high temperature oxidation method and having a mean particle diameter of not greater than 0.1 μm, wherein proportions of Fe, Mn and Zn in said soft ferrite raw material powder have a composition range in which Fe is 65 to 85 wt %, calculated as $Fe_2O_3$, Mn is 10 to 30 wt %, calculated as MnO, and Zn is 2 to 25 wt %, calculated as ZnO, with a P and a Cr content of P≦20 ppm and Cr≦50 ppm, and composition deviation of $Fe_2O_3$, MnO and ZnO is microscopically homogenous;

subsequently normal pressure sintering said soft ferrite powder at a temperature below 1,100° C.; and said sintering further comprising:

directly removing a binder of PVA added in said soft ferrite powder in advance while raising the temperature up to 400° C. in atmospheric air of the sintering furnace;

keeping said sintering furnace in a nitrogen atmosphere having an oxygen content of not greater than 100 ppm while raising said sintering furnace temperature from 400° C. to not more than 1100° C.; and the density of said sintered body finally obtained being at least 4.7 $g/cm^3$.

5. A method for producing a soft ferrite raw material powder comprising the steps of:

preparing a metal chloride aqueous solution containing $FeCl_2$, $MnCl_2$ and $ZnCl_2$;

spraying atomized liquid droplets of said metal chloride aqueous solution into a roasting furnace, wherein said atomized liquid droplets have a diameter of less than 200 μm;

cooling said atomized liquid droplets within ten seconds immediately after decomposition and oxidation to a temperature of higher than acid dew point but not higher than 400° C., wherein said cooling is provided by a cooling medium containing at least one of $H_2O$ and $O_2$.

6. A method for producing a soft ferrite raw material powder according to claim 5 wherein said metal chloride aqueous solution further contains trivalent Fe ions, said method further comprising:

reducing said trivalent Fe ions formed in a concentration step to divalent Fe ions thereby restricting the amount of trivalent Fe ions in the sprayed atomized liquid droplets.

7. A method for producing a soft ferrite raw material powder according to claim 5 wherein said metal chloride aqueous solution further contains trivalent Fe ions, said method further comprising:

adding at least one of metallic Mn and metallic Zn to said metal chloride aqueous solution thereby reducing said trivalent Fe ions formed in a concentration step to divalent Fe ions.

8. A method for producing a soft ferrite raw material powder comprising:

preparing a metal chloride aqueous solution containing $FeCl_2$, $MnCl_2$ and $ZnCl_2$;

spraying atomized liquid droplets of said metal chloride aqueous solution into a roasting furnace, wherein said atomized liquid droplets have a diameter of less than 200 μm;

oxidizing said atomized liquid droplets in said roasting furnace at a temperature of not less than 600° C. to provide an Fe—Mn—Zn ternary component metal oxide system in an atmosphere with $H_2O$ molar fraction being at least 5% and $O_2$ molar fraction being at least 2%;

subsequently cooling said oxidized atomized liquid droplets within ten seconds immediately after decomposition and oxidation to a temperature of higher than acid dew point but not higher than 400° C. by a cooling medium containing at least one of $H_2O$ and $O_2$.

\* \* \* \* \*